(12) United States Patent
Russo et al.

(10) Patent No.: US 8,685,224 B2
(45) Date of Patent: Apr. 1, 2014

(54) METHOD AND APPARATUS FOR HYDROGEN GENERATION

(75) Inventors: Tony W. Russo, Rockford, MI (US); Mallory S. Restis, Muskegon, MI (US); Pamela Restis, legal representative, Muskegon, MI (US)

(73) Assignee: Innovative Energy Systems and Design, LLC, Sparta, MI (US)

( * ) Notice: Subject to any disclaimer, the term of this patent is extended or adjusted under 35 U.S.C. 154(b) by 644 days.

(21) Appl. No.: 12/859,612

(22) Filed: Aug. 19, 2010

(65) Prior Publication Data

US 2011/0057455 A1 Mar. 10, 2011

Related U.S. Application Data

(60) Provisional application No. 61/239,833, filed on Sep. 4, 2009.

(51) Int. Cl.
*C25B 1/06* (2006.01)
*C25B 15/02* (2006.01)

(52) U.S. Cl.
USPC .................. 205/637; 204/229.2; 205/628

(58) Field of Classification Search
USPC ............... 204/229.2; 205/628, 637
See application file for complete search history.

(56) References Cited

U.S. PATENT DOCUMENTS

| | | |
|---|---|---|
| 1,080,005 A | 12/1913 | Fitzer |
| 3,755,130 A | 8/1973 | Zabolotny |
| 4,023,545 A | 5/1977 | Mosher et al. |
| 4,747,925 A | 5/1988 | Hasebe et al. |
| 5,062,940 A | 11/1991 | Davies |
| 5,728,287 A | 3/1998 | Hough et al. |
| 6,209,493 B1 * | 4/2001 | Ross .................................. 123/3 |
| 6,558,527 B2 | 5/2003 | Enomoto et al. |
| 6,998,029 B2 | 2/2006 | Hardee et al. |
| 7,191,737 B2 | 3/2007 | Klein |
| 2002/0056635 A1 | 5/2002 | Bentley |
| 2002/0088710 A1 | 7/2002 | Powell |
| 2006/0090712 A1 | 5/2006 | Ehresman |
| 2007/0000789 A1 * | 1/2007 | Libby et al. .................... 205/637 |
| 2007/0068076 A1 | 3/2007 | Isozaki et al. |
| 2007/0151865 A1 * | 7/2007 | Shimko et al. ................ 205/628 |
| 2009/0228191 A1 * | 9/2009 | Blank ............................ 701/109 |
| 2010/0147231 A1 * | 6/2010 | Bogers et al. ...................... 123/3 |

* cited by examiner

*Primary Examiner* — Nicholas A Smith
(74) *Attorney, Agent, or Firm* — Gardner, Linn, Burkhart & Flory, LLP (57) ABSTRACT

A method and apparatus for generating hydrogen gas includes a reactor vessel in which electrolysis takes place in water, an electrical current source coupled to the reactor, and a chemical energy conversion device that converts chemical energy to electrical current by reacting hydrogen gas with oxygen gas. Conduits convey the gases from the reactor to the conversion device, and safety devices and controls maintain safe and efficient operation of the system. A backfire suppression apparatus may be used to prevent a backfire from propagating backward through the system and causing damage, while a buffer tank may ensure that the gases supplied to the chemical energy conversion device are substantially free of liquid water or other contaminants. One or more heat exchangers maintain an optimal temperature range for the water inside the reactor, and a programmable logic controller may be provided to monitor and control the operation of the apparatus.

17 Claims, 7 Drawing Sheets

METHOD AND APPARATUS FOR HYDROGEN GENERATION

CROSS REFERENCE TO RELATED APPLICATION

The present application claims the benefit of U.S. provisional application Ser. No. 61/239,833, filed Sep. 4, 2009, which is hereby incorporated herein by reference in its entirety.

FIELD OF THE INVENTION

The present invention relates generally to devices for producing hydrogen and oxygen via electrolysis and, more particularly, to devices for producing hydrogen for use as a fuel.

BACKGROUND OF THE INVENTION

Hydrogen and oxygen gases may be generated from liquid water via electrolysis, as is well known in the art. Typically, such electrolysis processes exhibit limited efficiency and may be susceptible to other drawbacks that limit their commercial viability.

SUMMARY OF THE INVENTION

The present invention provides a method and apparatus for generating hydrogen for use as a fuel, which, optionally, may be used to at least partially drive an electrical chemical separation or electrolysis process. The hydrogen generating apparatus includes a reactor vessel containing one or more anode plates and one or more cathode plates that are electrically charged while they are at least partially submerged in water in order to generate hydrogen and oxygen via electrolysis. The hydrogen and oxygen are ultimately fed to a chemical energy conversion device such as a fuel cell, an internal combustion engine coupled to a generator, or the like, where the hydrogen and oxygen are reacted or combusted together to produce or generate electrical current. At least a portion of the electrical current produced by the chemical energy conversion device may be directed back to the anode and cathode plates of the reactor vessel, either directly or indirectly through batteries or the like, to help drive the electrolysis process. Optionally, a buffer tank, a backfire suppression apparatus, pressure sensors, safety valves, and a heat exchanger may be included in the system for maintaining safety and efficient operation. A method of generating hydrogen using the apparatus includes initiating electrolysis in the reactor by supplying electrical current from a current source until sufficient gas pressure has accumulated to begin operation of the chemical energy conversion device.

According to one form of the present invention, a hydrogen generating system includes a reactor having a reactor vessel, at least one cathode plate and at least one anode plate that produce hydrogen and oxygen. The cathode plate and the anode plate are metal plates spaced about ¼ inch apart from one another, and the reactor vessel is contains a volume of water in which the cathode plate and the anode plate are at least partially submerged, the cathode plate and the anode plate. The system further includes a chemical energy conversion device for reacting hydrogen and oxygen from the reactor vessel to produce electrical current. A first fluid conduit is coupled between the reactor vessel and the chemical energy conversion device, and an electrical current source is in selective electrical communication with the chemical energy conversion device and at least one of the cathode plate and the anode plate. A controller is operable to control the electrical current source, the chemical energy conversion device, and at least one of the anode plate and the cathode plate. The electrical current source supplies electrical current to at least one of the anode plate and the cathode plate, and to selectively receive electrical current from the chemical energy conversion device. The electrical current from the chemical energy conversion device is selectively supplied to at least one of the anode plate, the cathode plate, and the electrical current source. A method of generating hydrogen gas using the above apparatus is also provided.

Optionally, the chemical energy conversion device is a fuel cell or an internal combustion engine driving an electrical generator. The system may further include a backfire suppression apparatus to prevent a flame from propagating from the internal combustion engine and beyond the suppression apparatus. A heat exchanger may be provided in fluid communication with the reactor vessel, the heat exchanger adding or removing heat from the water in the reactor vessel.

These and other objects, advantages, purposes and features of the present invention will become apparent upon review of the following specification in conjunction with the drawings.

DESCRIPTION OF THE PREFERRED EMBODIMENTS

Figure 1:
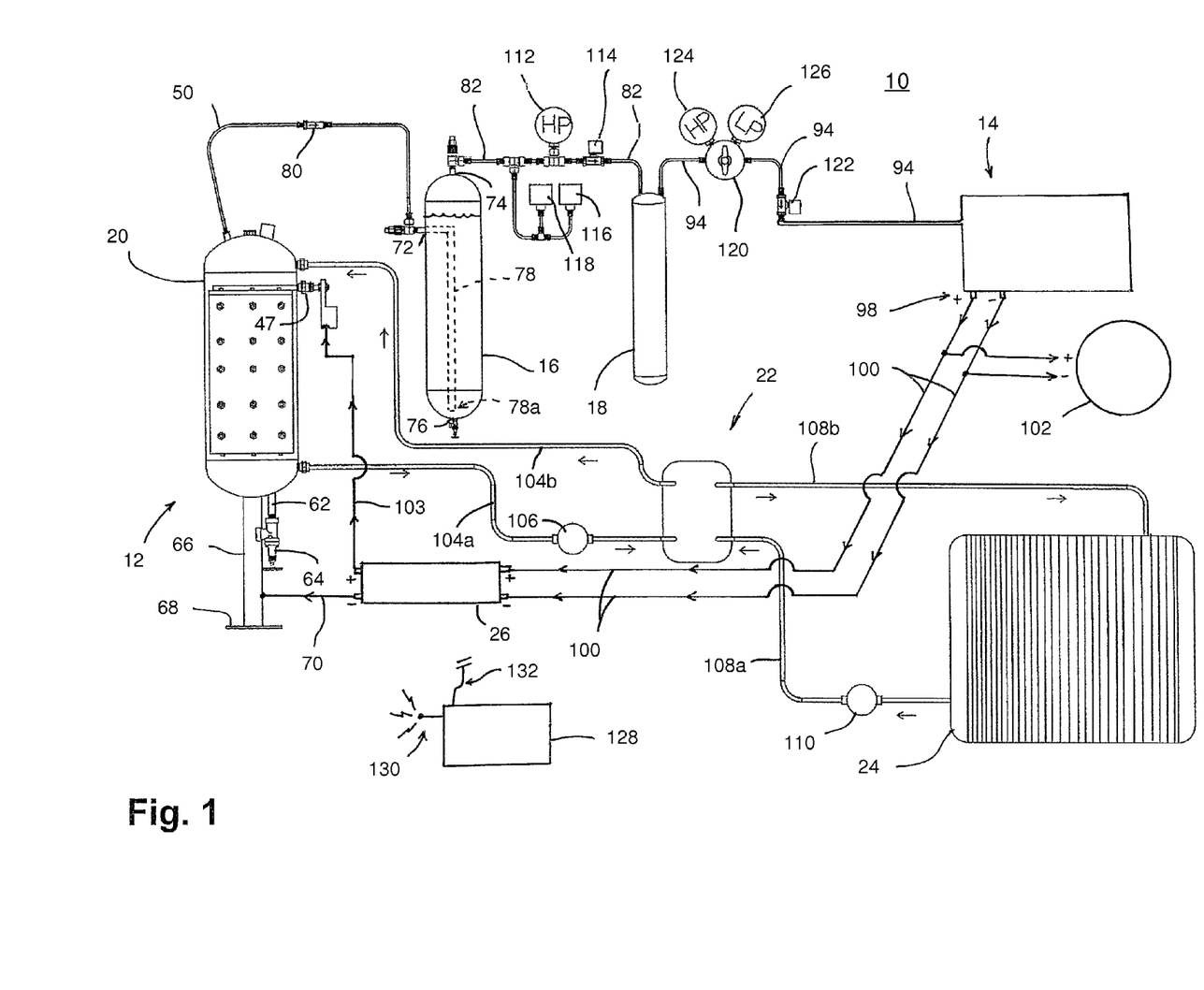
FIG. 1 is a diagram of a hydrogen generating apparatus in accordance with the present invention.

Referring now to the drawings and the illustrative embodiments depicted therein, a hydrogen generator apparatus 10 performs an electrolysis process to generate hydrogen and oxygen gases that are subsequently chemically reacted or combusted with one another to generate electricity, at least a portion of which may be used to drive the electrolysis reaction. Hydrogen generating apparatus 10 includes a reactor 12 for generating hydrogen and oxygen gases from liquid water, and a chemical energy conversion device 14 for reacting or combusting the hydrogen with the oxygen and producing an electrical current output (FIG. 1). The hydrogen generating apparatus thus produces hydrogen for use as a fuel in generating electricity, or for other uses such as heating.

In the illustrated embodiment, hydrogen generating apparatus 10 includes a buffer tank 16 for storing gas and for ensuring that liquid water from reactor vessel 20 does not flow downstream, and a backfire suppression apparatus 18 for ensuring that backfires or pressure spikes initiated downstream from the apparatus 18 do not propagate backwards through or past the apparatus 18. Buffer tank 16 and backfire suppression apparatus 18 are located between, and are in fluid communication with, a reactor vessel 20 (of reactor 12) and chemical energy conversion device 14. Reactor vessel 20 is in fluid communication with a high pressure heat exchanger 22, which is in separate fluid communication with a low pressure heat exchanger 24, such as a radiator or the like. An electrical current source 26, such as a plurality of chemical batteries, is in electrical communication with reactor 12 and also with chemical energy conversion device 14.

Figure 2:
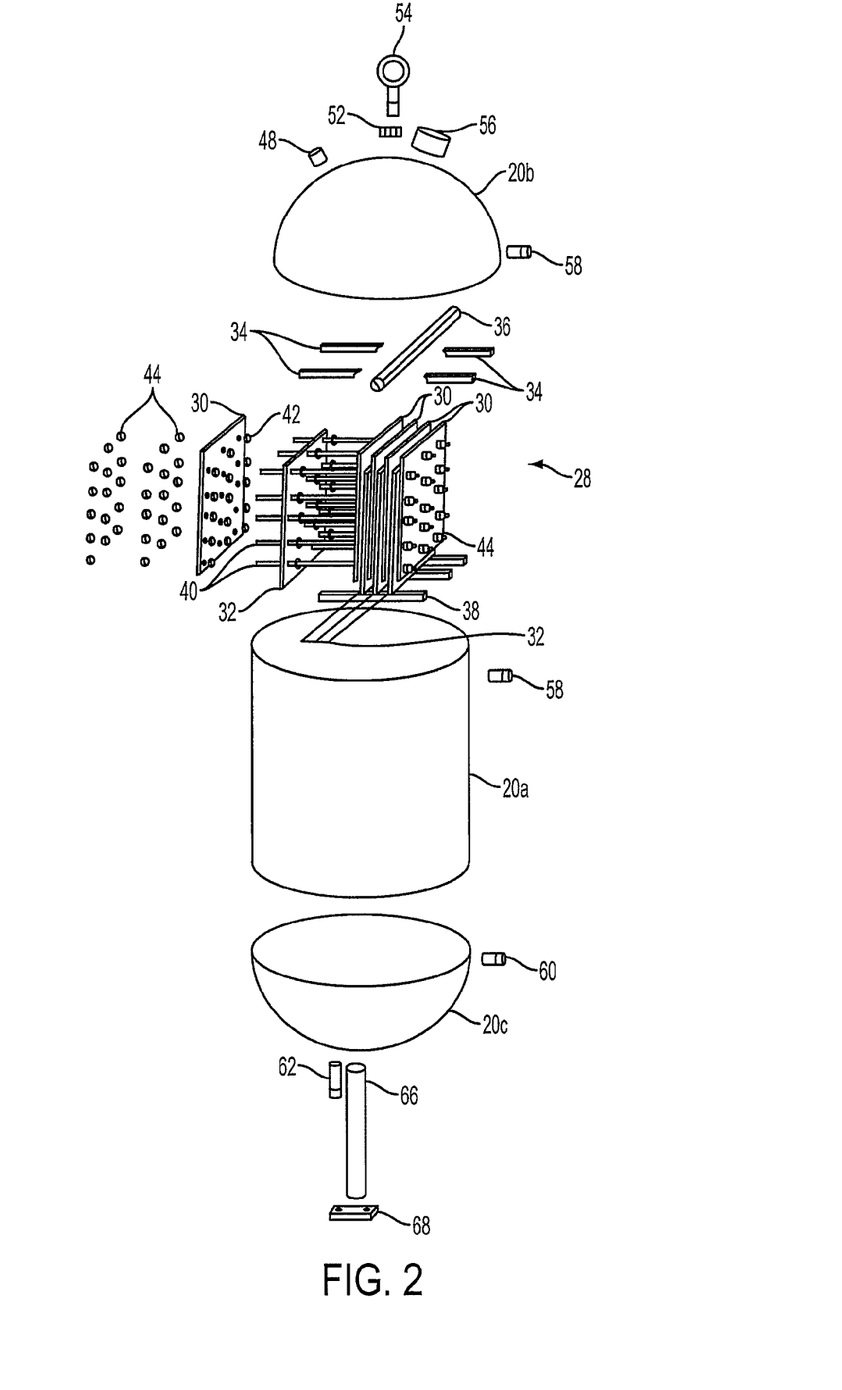
FIG. 2 is an enlarged exploded view of a reactor vessel of the hydrogen generating apparatus of FIG. 1.
Figure 3:
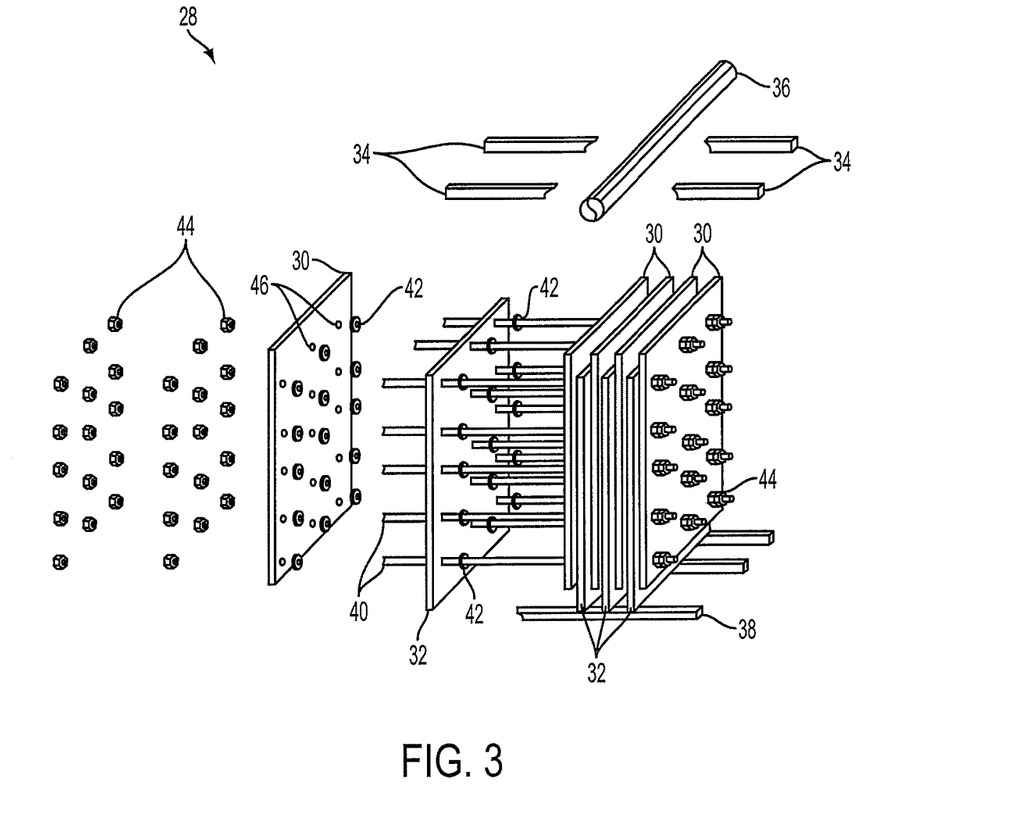
FIG. 3 is an enlarged perspective view of a portion of a reactor plate assembly contained within the reactor vessel of FIG. 2.
Figure 4:
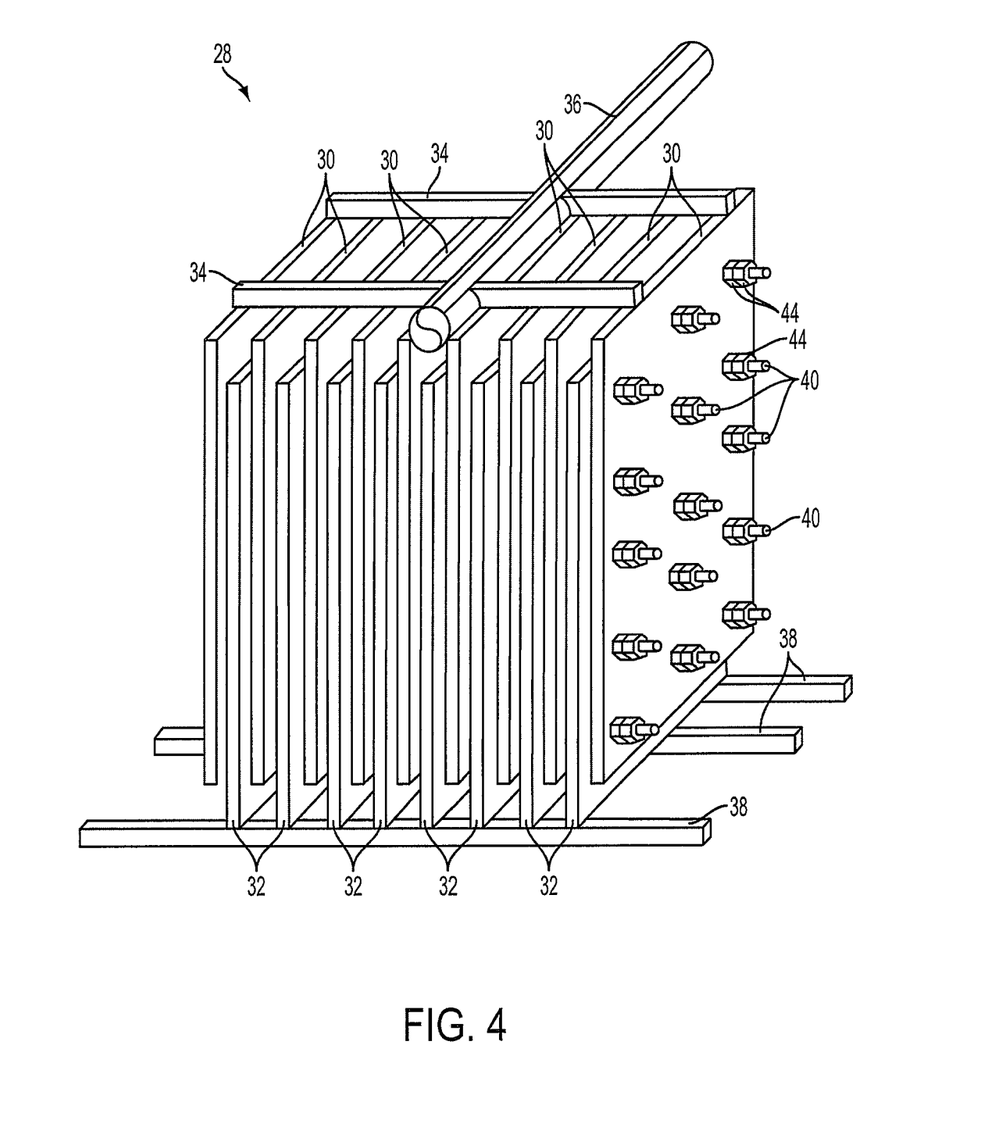
FIG. 4 is an enlarged perspective view of the plate assembly of FIG. 3, shown fully assembled.

Reactor vessel 20 houses a reactor plate assembly 28 that generates hydrogen ($H_2$) and oxygen ($O_2$) gases when it is at least partially submerged in water within vessel 20 and energized with electrical current. Reactor plate assembly 28 includes a plurality of metal anode plates 30 in spaced arrangement with a plurality of metal cathode plates 32 (FIGS. 2-4). For example, in the illustrated embodiment, reactor plate assembly 28 includes nine anode plates 30 and eight cathode plates 32, each plate spaced about ¼-inch from the immediately adjacent plate(s). In another embodiment, a reactor plate assembly including ten anode plates and nine cathode plates, each plate spaced about ¼-inch from the immediately adjacent plate(s), has been found to be advantageous. Anode plates 30, which receive positive-polarity current, and cathode plates 32, which receive negative-polarity current, are arranged in staggered alternating fashion whereby top portions of anode plates 30 are spaced at least slightly above the top portions of cathode plates 32 (such as about ½-inch), and bottom portions of cathode plates 32 are spaced at least somewhat below bottom portions of anode plates 30 (also about ½-inch), as best shown in FIG. 4. A pair of anode rods 34 are mechanically and electrically coupled to top portions of anode plates 30, such as via welding, and are supplied with positive-polarity electrical current via an anode electrical supply rod 36, which is generally perpendicular to, and in electrical communication with, anode rods 34, which themselves are generally perpendicular to anode plates 30. Cathode plates 32 are mechanically and electrically coupled to three cathode electrical supply rods 38, such as via welding.

In the illustrated embodiment, anode plates 30 and cathode plates 32 are held in fixed, spaced, and electrically isolated arrangement by fifteen non-conductive rods having non-conductive washers or spacers 42 disposed thereon between each adjacent anode plate and cathode plate to maintain the spacing of the plates from one another. Non-conductive rods 40 may be externally threaded for receiving internally threaded fasteners 44, such as threaded nuts or the like, and are insertable through apertures 46 in the anode plates 30 and cathode plates 32. Optionally, two or more of threaded fasteners 44 may be used at each opposite end of non-conductive rods 40, with one of the threaded fasteners serving as a jam nut to prevent inadvertent removal of the fasteners from the end portions of the non-conductive rods.

Thus, reactor plate assembly 28 may be assembled by threading one or two of fasteners 44 at an end portion of each of the non-conductive rods 40, inserting each of the non-conductive rods 40 into a respective aperture 46 in a first anode plate 30, placing one of the non-conductive spacers 42 over each respective non-conductive rod 40 until the spacers abut the first anode plate 30, inserting each of the non-conductive rods 40 into corresponding apertures in a first cathode plate 32 until the cathode plate abuts the non-conductive spacers that are already abutting the first anode plate 30, placing another non-conductive spacer 42 over each of the non-conductive rods 40 until the spacers are abutting the first cathode plate 32, and repeating the process in this sequence until all of the anode plates and all of the cathode plates and all of the spacers are assembled onto the non-conductive rods in alternating fashion. Once the last plate is installed on the non-conductive rods, a final set of threaded fasteners 44 is threaded onto the exposed ends of the non-conductive rods and tightened to hold reactor plate assembly 28 together as a unit. Once the plates are assembled together, anode rods 34 are welded along top surfaces of anode plates 30, and cathode electrical supply rods 38 are welded along bottom surfaces of cathode plates 32 (FIG. 4).

Reactor plate assembly 28 is positioned in reactor vessel 20, where cathode electrical supply rods 38 are electrically coupled (such as via welding) to an interior surface of the reactor vessel 20, while anode electrical supply rod 36 passes through at least one aperture in a wall of reactor vessel 20 via a dielectric union 47 (FIGS. 1 and 2) whereby the anode electrical supply rod 36 remains electrically isolated from the reactor vessel. Anode electrical supply rod 36 is electrically coupled (such as via welding) to anode rods 34 and substantially sealed inside of reactor vessel 20, as will be described below.

In the illustrated embodiment, anode plates 30 and cathode plates 32 comprise 316 stainless steel (316-SS) plates having approximately ⅛-inch thickness, widths of about 9½ inches, and heights of about 17 inches. Each plate is spaced by approximately ¼-inch from each adjacent plate, and is held fixed at that spacing by non-conductive spacers 42, which may be high-temperature, high-dielectric nylon washers having dimensions of ¾-inch outer diameter (O.D.), ⅜-inch inner diameter (I.D.), and ¼-inch thickness. Non-conductive rods 40 may be ⅜-inch O.D. threaded rods having lengths of approximately 7⅞ inches, and made of high-temperature, high-dielectric nylon, such as the same or similar material as spacers 42. The apertures 46 in anode plates 30 and cathode plates 32, which receive non-conductive rods 40, may have nominal diameters slightly larger than the O.D. of rods 40 (such as approximately 0.379 inches). Threaded fasteners 44 may be ⅜₆-inch nylon nuts (such as of the same high-temperature, high-dielectric nylon material as spacers 42 and/or rods 40), and are internally threaded to match the external threads of non-conductive rods 40. Although shown and described as having fifteen of the non-conductive rods 40 holding reactor plate assembly 28 together, it will be appreciated that substantially any number of non-conductive rods may be used so long as anode plates 30 and cathode plates 32 may be held in sufficiently consistently-spaced arrangement under anticipated operating conditions, which may include relatively high temperatures and forces due to current-warping in which high current flow through the conductive materials causes the materials to bend or warp.

Anode rods 32 may comprise square rods of 316-SS having cross sectional dimensions of ¼-inch square, with lengths of approximately 6⅞ inches, and may be connected to anode plates 30 via stainless steel welds. Anode electrical supply rod 36 may be a round ½-inch diameter and 10½ inch long rod of 316-SS welded to anode rods 34 with stainless steel welds, and positioned near the middle portions of anode rods 34, such as between the fourth and fifth anode plates, or between the fifth and sixth anode plates, when counting from either end of reactor plate assembly 28. The dielectric union 47 through which anode electrical supply rod 36 exits reactor vessel 20 may be a high-temperature ¾-inch threaded dielectric union with a negative outer portion welded to the reactor vessel using a ¾ inch diameter, 1½ inch long 304 stainless steel (304-SS) pipe nipple welded to reactor vessel 20, and a positive side or portion of the dielectric union coupled to the anode electrical supply rod 36 at a 304-SS threaded bushing welded to anode electrical supply rod 36. The bushing may include a ⅝-inch 304-SS stud, about 3 inches in length, welded to the stainless steel bushing for connecting to electrical current source 26, as will be described below. Cathode electrical supply rods 38 may comprise square 316-SS bars having cross sectional dimensions of ¼-inch square and lengths of approximately 9¾ inches, each bar being welded with stainless steel to each cathode plate 32, and welded at the bars' respective ends to an inner surface of reactor vessel 20. The described configuration and parameters of reactor plate assembly 28 has been found to provide an advantageous generation of hydrogen gas with minimized electrical current draw from electrical power source 26, while minimizing hydrogen embrittlement and reduction oxidation.

Reactor vessel 20 includes a generally cylindrical center section 20a having a top cap 20b and a bottom cap 20c at opposite ends of the cylindrical center section 20a. Reactor vessel 20 is capable of withstanding significant internal pressure, such as pressures in excess of 250 psi. Reactor vessel 20 may be made from 304-SS, for example, with cylindrical centers section 20a comprising a 10-inch diameter seamless pipe or cylinder, and top and bottom caps 20b, 20c comprising 10-inch diameter hemispherical caps welded to respective ends of the cylindrical center section 20a. Top cap 20b includes a gas coupling 48 for directing hydrogen and oxygen gases out of reactor vessel 20. Gas coupling 48 may be a ½ inch stainless steel coupling having a ½ inch stainless steel threaded bushing threaded inside, and a ⅜-inch 316-SS threaded tube compression fitting threaded into the bushing for coupling to a first gas conduit 50. A fastener such as an internally threaded stainless steel nut 52 may be coupled to a top-center portion of top cap 20b and configured for receiving a removable threaded eyelet or lifting eye 54 that is provided to facilitate handling of reactor vessel 20, such as by suspending from an overhead cable and hook (not shown).

A water-fill port 56 is coupled to top cap 20b, and may be selectively sealed with a corresponding pipe plug that is removable for adding water to reactor vessel 20. Optionally, a water return line or water supply line may be fitted in place of, or in addition to, water-fill port 56. For operation, reactor vessel 20 is filled with water (such as pure water or water mixed with other fluids or compounds, such as anti-corrosion compounds or other chemicals that may enhance electrolysis) via water-fill port 56 until reactor plate assembly 28 is substantially submerged in the water. Because water may be lost from hydrogen generating apparatus 10, such as from chemical energy conversion device 14, water may be added to reactor vessel 20 through water-fill port 56 to maintain a desired water level in the vessel. Water-fill port 56 may be a 2-inch 304-SS coupling welded to reactor top cap 20b and sealed with a corresponding 2-inch 304-SS pipe plug sealed with PTFE pipe tape, for example.

The electrolysis that takes place at reactor plate assembly 28 typically adds heat to the water inside reactor vessel 20. Heat exchangers 22, 24 may therefore be used to cool the water inside reactor vessel 20. The water may be circulated through reactor vessel 20 via a top circulation port 58 and a bottom circulation port 60, where top circulation port 58 is disposed at a side portion of top cap 20b and bottom circulation port 60 is disposed at a side portion of bottom cap 20c. Top and bottom circulation ports 58, 60 may comprise ¾-inch by 1½ inch 304-SS nipples that provide threaded connections for circulation of water from reactor vessel 20 through high pressure heat exchanger 22, as will be described below.

In addition to bottom circulation port 60, bottom cap 20c includes a drain port 62 including, for example, a ¾-inch diameter and 5-inch long 304-SS nipple having a ¾-inch valve 64 to selectively seal drain port 62. Valve 64 may be a 304-SS Jamesbury ball valve, for example, available from Metso Automation. A reactor vessel support 66 extends downward from a central portion of bottom cap 20c, and is coupled to a support plate 68, which is fastened to a support surface (not shown). Reactor vessel support 66 may be a 2-inch diameter and 14-inch long 316-SS pipe welded to reactor bottom cap 20c, while support plate 68 may be a 6-inch long, 2-inch wide, ¼-inch thick 316-SS plate bolted to a support frame or other support surface. Reactor vessel support 66 and support plate 68 are in electrical communication with reactor vessel 20, and may be coupled directly to a battery negative/common ground terminal of electrical current source 26 via a negative-polarity electrical cable or wire 70, as in FIG. 1.

Reactor vessel 20 has a water capacity of approximately 11.5 gallons, a typical water temperature operating range of 85 degrees to 114 degrees Fahrenheit (F), an operating pressure typically in the range of about 150 psi to 225 psi, and an electrical current input typically in the range of about 75 amps to 150 amps applied to reactor plate assembly 28 via reactor vessel support 66 (negative polarity) and anode electrical supply rod 36 (positive polarity). Typically, when electrical current is applied to reactor assembly 28 at 12 volts DC (12-VDC), combined hydrogen and oxygen production is approximately four pounds per minute, while production rises to approximately 9½ pounds per minute while operating at 24 volts dc (24-VDC).

In the illustrated embodiment, 304 and 316 stainless steels are used extensively in reactor vessel 20 to reduce or minimize the effects of hydrogen embrittlement, which can affect both metals and non-metals, and which can be enhanced by the presence of water. The use of 316-SS for anode plates 30 and cathode plates 32 further serves to reduce or eliminate harmful effects of reduction oxidation. However, it will be appreciated that substantially any other suitably strong, conductive, and corrosion-resistant metals may be used, and even certain non-metals may be suitable for applications in which electrical conductivity is not required.

In the illustrated embodiment, reactor vessel top cap 20b and bottom cap 20c are welded to cylindrical center section 20a, and the various described fittings may be welded to reactor vessel 20 using tungsten inert gas (TIG) welding using the QW-482 welding procedure as described in ASME Boiler and Pressure Vessel Code § IX QW200.1 using parameters that will now be described. AWS class filler 316-SS having ³⁄₃₂-inch diameter and welded at 70-90 amps DC reverse is fed with grove-type GTAW argon at 25 cubic feet per minute with purge backing argon at 99.99% pure 2% throated pure tungsten. Cup size may be #4, #6, #8 using a weave bead weld technique in a two-pass weld layer. It will be appreciated that the above-described weld technique is exemplary and not intended to be limiting in any way.

Buffer tank 16 substantially eliminates any liquid water from first gas conduit 50 so that the hydrogen and oxygen gases received by chemical energy conversion device 14 are substantially dry and free of liquid water. Buffer tank 16 is a generally cylindrical vessel, constructed similarly to reactor vessel 20, that is at least partially filled with water or other non-combustible fluid, and includes a gas inlet port 72, a gas outlet port 74, and a drain port 76. A second gas conduit 78 enters buffer tank 16 at gas inlet port 72 and is at least partially submerged in the water contained in buffer tank 16. Second gas conduit 78 has a submerged gas outlet 78a from which hydrogen and oxygen gases are emitted. The gases bubble upwardly through the water contained in buffer tank 16 and form a volume of gas above the water level in the tank, at which point the gases exit the tank via gas outlet port 74 at the top of the tank. Gas inlet and outlet ports 72, 74 may be fitted with gas valves for selectively limiting or preventing the flow of gases through buffer tank 16. Drain port 76 may be fitted with a valve to selectively permit draining of the tank. A spring check valve 80 may be fitted in-line with first gas conduit 50 to prevent a pressure rise or spike in buffer tank 16 from reaching reactor vessel 20.

The gases leave buffer tank 16 through gas outlet port 74 and are directed into backfire suppression apparatus 18 via a third gas conduit 82. Backfire suppression apparatus 18 (FIG. 5) is constructed similarly to reactor vessel 20, including a cylindrical center section 18a, a top cap 18b, and a bottom cap 18c, and is partially filled with a fluid, such as water (not shown). A third gas conduit 82 enters apparatus 18 via top cap 18b, and extends downwardly into the apparatus so that a check valve 84 positioned at a distal end of third gas conduit 82 is submerged in the fluid contained in the apparatus 18 and positioned near bottom cap 18c. Check valve 84 may be coupled to third gas conduit 82 via a compression connector 86, while third gas conduit 82 itself passes through top cap 18b via a female pipe thread opening 88 fitted with another compression connector 90. Another female pipe thread opening 92 is provided in top cap 18b for connection of a fourth gas conduit 94 (FIG. 1) that directs gas from backfire suppression apparatus 18 to chemical energy conversion device 14. Hydrogen and oxygen gas enter backfire suppression apparatus 18 via third gas conduit 82 and is discharged out of check valve 84, whereupon the gas bubbles through the fluid inside apparatus 18 and collects in a head space or volume above the fluid, from which it exits the apparatus 18 via fourth gas conduit 94.

Figure 5:
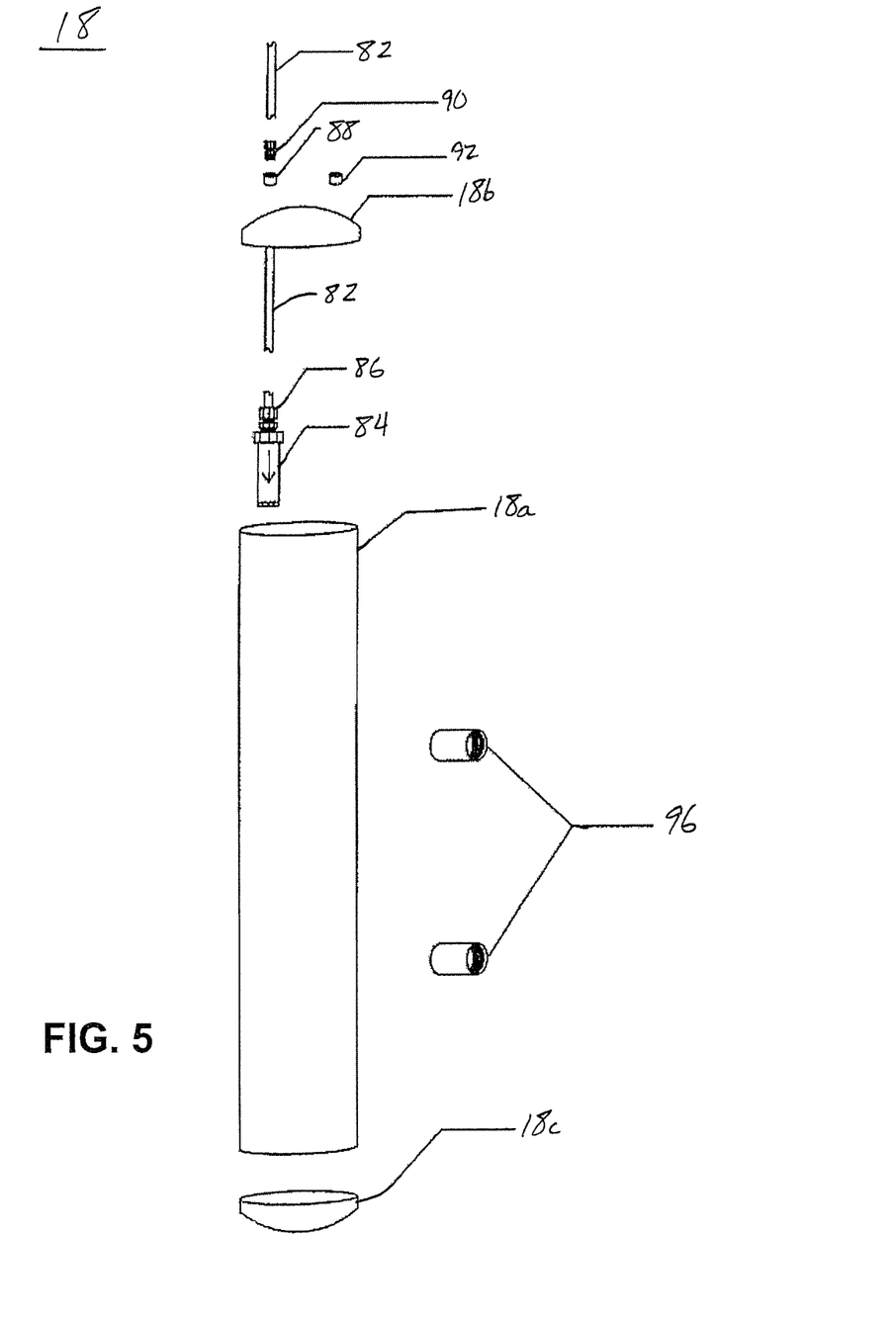
FIG. 5 is an exploded perspective view of a backfire suppression apparatus of the hydrogen generator of FIG. 1.

In the illustrated embodiment, backfire suppression apparatus 18 has a diameter approximately 3 inches and a length of approximately 17 inches, with a wall thickness of approximately 0.065 inches, and may be made from 316-SS. Check valve 84 may be a precision ⅜-inch stainless steel spring loaded check valve positioned approximately ⅜ inch from the bottom of bottom cap 18c. Third gas conduit 82 may be a ⅜-inch diameter 316-SS tube or pipe coupled to check valve 84 via compression connector 86, which may be a ⅜-inch O.D. stainless steel compression connector. Female pipe thread openings 88, 92 may be ⅜ inch 316-SS female pipe thread openings that are welded (such as via TIG welding) to top cap 18b, while compression connector 90 may be a modified 316-SS ⅜-inch diameter compression connector coupled to a ⅜-inch stainless steel male pipe. Optionally, a pair of ports 96a, 96b, such as ½-inch 304-SS female threaded pipe openings, are provided in the side of cylindrical center section 18a of backfire suppression apparatus 18, for observing the fluid level inside the apparatus.

In the event of a high pressure spike propagating to the backfire suppression apparatus 18, such as due to a backfire at chemical energy conversion device 14 propagating through fourth gas conduit 94, any flame propagating through fourth gas conduit 94 is expended or suppressed in the top portion of backfire suppression apparatus 18 above the fluid contained therein. The rapid pressure rise in backfire suppression apparatus 18 causes check valve 84 to close, which substantially prevents a significant pressure rise in third gas conduit 82 and throughout all of the components of the hydrogen generating apparatus that are in fluid communication with the third gas conduit.

Chemical energy conversion device 14 receives the hydrogen and oxygen gases via fourth gas conduit 94 and converts the chemical energy of the hydrogen gas into electrical current by reacting or combusting the hydrogen gas with the oxygen gas. It will be appreciated that electrolysis processes generally produce a substantially stoichiometric ratio of hydrogen gas to oxygen gas, wherein about twice the volume of hydrogen gas ($H_2$) is produced as the volume of oxygen gas ($O_2$) so that when the gases are reacted or combusted together, water ($H_2O$) results as the sole combustion product without any remaining elemental hydrogen or oxygen. Examples of chemical energy conversion devices that may be suitable for use with the hydrogen generating apparatus of the present invention include, for example, a fuel cell device that reacts the hydrogen and oxygen to produce an electrical output in a substantially direct manner, or an internal combustion engine (such as a four-stroke engine) driving an electrical generator, which engine may also take in additional oxygen to ensure complete combustion of the hydrogen gas. For example, it has been found that a 10.5 horsepower four-stroke internal combustion engine (such as may be available from Briggs & Stratton Corp. of Milwaukee, Wis.) driving a 7.5-12 kilowatt generator may work advantageously together and be of an appropriate size for use in combination with the above-described reactor for the generation of hydrogen gas and electricity that are consumed by the engine and reactor, respectively. Regardless of the type of chemical energy conversion device used, electrical current is output by the conversion device at electrical terminals 98, which supply electrical current, via electrical conduits or wires 100 to electrical current source 26 and/or an electrical current storage or distribution or consumption device 102 that may direct at least some of the electrical current from electrical terminals 98 to uses outside of hydrogen generating apparatus 10. For example, device 102 may comprise a breaker box for supplying power to a building or house structure, or device 102 may comprise a furnace or heating unit (such as a rooftop heating unit). It will be appreciated that device 102 may be substantially any device or apparatus that consumes electricity and/or hydrogen or oxygen gases, without departing from the spirit and scope of the present invention.

Electrical current source 26 may be substantially any type of device for storing electrical potential such as, for example, one or more chemical batteries or electrical capacitors. In the illustrated embodiment, electrical current source 26 comprises two banks of chemical batteries, each bank including four 1,158-amp batteries wired in parallel within each bank for a maximum total of 4,632 amps at 12-VDC per bank. Optionally, the two banks may be electrically joined in series to produce a total output of 24 VDC. Electrical current source 26 supplies electrical current at 12-VDC or 24-VDC to reactor plate assembly 28 via negative-polarity electrical wire 70 coupled to reactor vessel support 66 and a positive polarity wire 103 coupled to anode electrical supply rod 36, as described above. Electrical current source 26 may be recharged via electrical wires 100 and/or by an external source (not shown) that is separate from hydrogen generating apparatus 10. For example, the external power source may be an AC voltage source with a DC convertor for directing DC current to the electrical current source 26 for charging the current source.

As noted above, heat exchangers are used to maintain the water of reactor vessel 20 at an optimum level, such as between about 84 degrees F. and 114 degrees F. Because the water inside of the reactor vessel 20 is warmed by the electrolysis process taking place at reactor plate assembly 28, it may be desirable to remove heat from the water in order to maintain an optimal water temperature. This temperature control may be accomplished with high pressure heat exchanger 22 and low pressure heat exchanger 24 in a manner that will now be described. Water is circulated through reactor vessel 20 and high pressure heat exchanger 22 via closed loop fluid conduits 104a, 104b. Water is drawn out of reactor vessel 20 through bottom circulation port 60 by a first water pump 106 located downstream of bottom circulation port 60 in-line with fluid conduit 104a. Water that exits first water pump 106 is directed into high pressure heat exchanger 22, which may be a 316-SS brazed-plate stainless steel heat exchanger designed for operation with fluid pressures up to approximately 250 psi, such as model no. BP400-30 available from Bell and Gossett of Morton Grove, Ill. The water entering high pressure heat exchanger 22 is cooled before passing into fluid conduit 104b and returning to reactor vessel 20 via top circulation port 58. By directing water into reactor vessel 20 via top circulation port 58, it is ensured that at least portions of some of the anode plates and cathode plates of the reactor plate assembly are constantly bathed in a flow of water and that bottom circulation port 60 always has a supply of water, even if the water level is below the top portions of the plates.

High pressure heat exchanger 22 removes heat from the water directed into it by fluid conduit 104a by conducting that heat into a fluid supplied to the high pressure heat exchanger via secondary closed loop fluid conduits 108a, 108b. A second water pump 110 draws fluid out of low pressure heat exchanger 24 via secondary fluid conduit 108a and directs the fluid into high pressure heat exchanger 22 for conductive heat exchange between the fluid of low pressure heat exchanger 24 and the water of reactor vessel 20. Warmed low pressure fluid exiting from high pressure heat exchanger 22 is directed or returned back to low pressure heat exchanger 24 via secondary fluid conduit 108b. Low pressure heat exchanger 24 may be a conventional radiator or the like for cooling the fluid that flows there-through before returning the fluid to the high pressure heat exchanger 22, where heat is drawn out of the water of reactor vessel 20 and taken to low pressure heat exchanger 24 for cooling.

Several devices are incorporated along third gas conduit 82 between buffer tank 16 and backfire suppression apparatus 18, for maintaining the safety and control of hydrogen generating apparatus 10. For example, a direct-readout pressure gauge 112 may be disposed along third gas conduit 82 for reading the gas pressure output of reactor 12, which is substantially identical to the pressure inside of buffer tank 16. A high pressure solenoid 114 is positioned downstream of pressure gauge 112 for selectively controlling the flow of gas through third gas conduit 82. A high pressure limit switch 116 and low pressure limit switch 118 are positioned in fluid communication with third gas conduit 82 for detecting when gas pressure inside the third gas conduit reaches a predetermined high threshold limit or a predetermined low threshold limit, respectively. When either high pressure limit switch 116 or low pressure limit switch 118 detect their respective threshold value, high pressure solenoid 114 may be directed to open or close, depending on which limit switch has sent a signal, as will be described in greater detail below.

Positioned between backfire suppression apparatus 18 and chemical energy conversion device 14 are a high pressure regulator 120 and a low pressure solenoid 122 in fluid communication with fourth gas conduit 94. High pressure regulator 120 reduces the gas pressure received from backfire suppression apparatus 18 down to a pressure that is usable by chemical energy conversion device 14, such as approximately 1 psi to 5 psi. Optionally, high pressure regulator 120 includes a direct readout high pressure gauge 124 for displaying the gas pressure exiting the backfire suppression apparatus 18, and a direct read low pressure gauge 126 for displaying the gas pressure in fourth gas conduit 94 downstream of regulator 120. Low pressure solenoid 122 is operable to close off the flow of gases through fourth gas conduit 94, such as when the gas pressure exiting high pressure regulator 120 is excessively high.

Accordingly, hydrogen and oxygen gases produced by reactor 12 are conducted to buffer tank 16 by first gas conduit 50, the buffer tank 16 ensuring that the gases continuing downstream are substantially free of liquid water or other contaminants. Third gas conduit 82 conducts the gases from buffer tank 16 to backfire suppression apparatus 18, and includes pressure sensors 112, 116, 118 and solenoid 114 for monitoring and controlling the flow of gases through third gas conduit 82 into backfire suppression apparatus 18. Apparatus 18 includes a check valve 84 and a volume of water for preventing the propagation of a flame through the apparatus 18, and further preventing the propagation of a gas pressure spike back through third gas conduit 82 and first gas conduit 50 into reactor 12. High pressure gas from backfire suppression apparatus 18 is directed through regular 120 via fourth gas conduit 94, where high pressure regulator 120 reduces the gas pressure that is ultimately received by chemical energy conversion device 14. Chemical energy conversion device 14 reacts or combusts the hydrogen with the oxygen produced in reactor 12 and converts the chemical energy into an electrical current output, portions of which may be directed to either or both of the electrical current source 26 and the electrical power storage/distribution/consumption device or apparatus 102, where it can be used for purposes outside of the operation of hydrogen generating apparatus 10. Optionally, hydrogen and oxygen gases may be directed from reactor vessel 20 (or from buffer tank 16, or backfire suppression apparatus 18) directly to a gas storage device, such as storage tank or the like, so that the hydrogen and oxygen gases generated by the reactor plate assembly 28 may be used for purposes outside of hydrogen generated apparatus 10.

Optionally, a controller such as a programmable logic controller 128 (FIGS. 1 and 7) may be provided for controlling the various functions and operations of hydrogen generating apparatus 10. Programmable logic controller 128 is operable to perform substantially all of the control functions of hydrogen generating apparatus 10 including, for example, receiving signals from high pressure limit switch 116 and low pressure limit switch 118 to control high pressure solenoid 114, receiving pressure information from high pressure regulator 120 for controlling low pressure solenoid 122, selectively controlling the output of electrical current from electrical current source 26 to reactor plate assembly 28 via electrical wires 70, 103, starting, running, and terminating operation of chemical energy conversion device 14, and operating first and second water pumps 106, 110 for controlling the temperature of the water contained in reactor vessel 20. Programmable logic controller 128 may include a plurality of controls and/or displays for selecting desired operation parameters for hydrogen generating apparatus 10, and may send and receive data and control signals to various parts of the generating apparatus via a wireless transceiver 130 or via direct wiring 132, for example.

Figure 7:
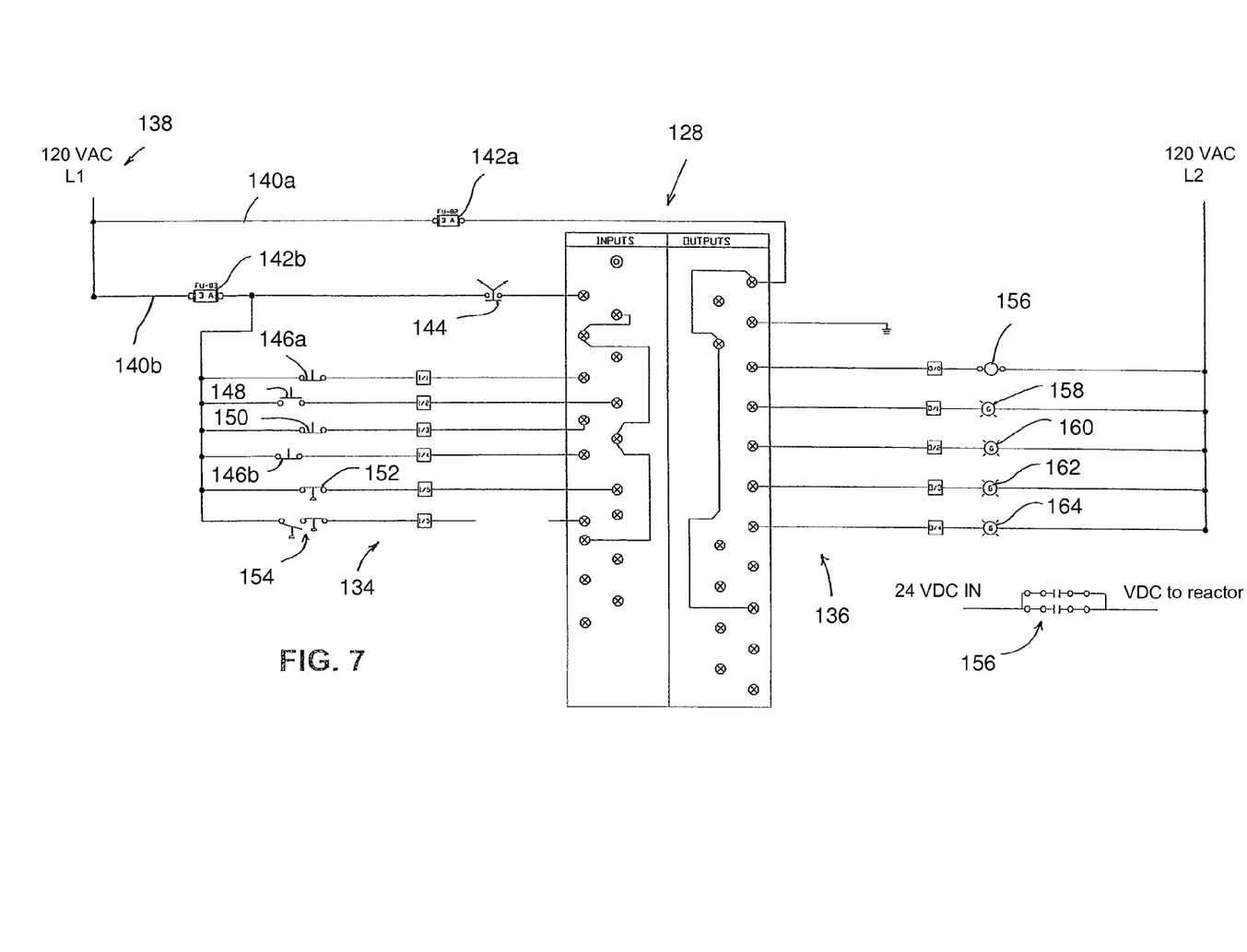
FIG. 7 is a wire diagram of a programmable logic controller for use with the hydrogen generating apparatus of the present invention.

Programmable logic controller 128 receives a plurality of input signals 134 and controls hydrogen generating apparatus 10 via a plurality of output signals 136 (FIG. 7). In the illustrated embodiment, controller 128 receives 120 VAC current from a current source 138 that supplies current to controller 128 via a pair of wires 140a, 140b, each wire having a respective fuse 142a, 142b. A power switch 144 is used to selectively energize controller 128. A pair of emergency-stop switches 146a, 146b may be placed in separate locations along the hydrogen generating apparatus to provide a quick-shutoff in the event that an operator detects abnormal or undesired operation of the apparatus, where either of the stop switches 146a, 146b is capable of de-energizing the reactor. A reactor start switch 148 is used by the operator to initiate the hydrogen generation sequence or method (described below), while a reactor stop switch 150 is provided for halting the hydrogen generation method. An operating pressure switch 152, triggered by a signal from pressure gauge 112, for example, indicates to the controller 128 when the gas pressure in the apparatus is within the normal operating range so that the apparatus may be run through the startup or normal run procedures described below. A dual high/low pressure lockout switch 154 provides a signal to controller 128 to adjust operation of the apparatus 10 according to whether a high or low pressure signal is received from high pressure limit switch 116 or low pressure limit switch 118, respectively.

Output signals 136 from programmable logic controller 128 include a reactor-energize signal sent through a reactor solenoid 156 to energize the reactor 28 with current from electrical current source 26. In addition, a reactor-on indicator 158 (such as an LED or the like) illuminates when the reactor is energized, a gas pressure indicator 160 illuminates when gas pressure in the apparatus is in a normal operating range, a reactor timer indicator 162 illuminates when the apparatus is in a startup mode in which current from electrical current source 26 is alternately supplied from different banks of batteries, and a gas flow indicator 164 illuminates when hydrogen and oxygen gases are permitted to flow through regulator 122 to run chemical energy conversion device 14.

Thus, the hydrogen generating apparatus 10 may be operated as a substantially closed loop system in which the only inputs are water added to reactor vessel 20 to replace water that may be lost through chemical energy conversion device 14, and DC current supplied to electrical current source 26 for maintaining its charge. However, it will be appreciated that sufficiently high levels of efficiency or self-propagation are envisioned wherein the supply of current to electrical current source 26 from an independent power source is rendered unnecessary or substantially unnecessary, and that liquid water may be recovered from the exhaust of chemical energy conversion device 14 for return to reactor vessel 20 so that the addition of water from an outside water source is also substantially unnecessary.

To operate hydrogen generating apparatus 10, water is added to reactor vessel 20 to substantially submerge reactor plate assembly 28, although it will be understood that reactor plate assembly 28 is capable of generating hydrogen and oxygen gases even when cathode plates 32 and anode plates 30 are only partially submerged. Fluid levels in buffer tank 16 and backfire suppression apparatus 18 may also be checked to ensure that they are at appropriate levels for safe operation of the system. Power is then supplied to programmable logic controller 128, such as from electrical current source 26 or an outside current source, and controller 128 is directed to energize reactor 12. Controller 128 may include a delay timer that begins a countdown (such as a 15-minute countdown) during which time the first bank of batteries of the electrical current source 26 is electrically coupled to reactor plate assembly 28 in order to initiate the production of hydrogen and oxygen gases inside reactor vessel 20. During this period, the second bank of batteries in the electrical current source 26 does not supply current to reactor 12, and may receive outside charging current from an outside current source, such as a 40 amp 12 volt DC charging system.

While the reactor plate assembly 28 is energized by electrical current source 26 and producing hydrogen and oxygen gases, controller 128 monitors the gas pressure in reactor vessel 20 and buffer tank 16 via high pressure limit switch 116, low pressure limit switch 118, and/or direct readout pressure gauge 112. For example, controller 128 may direct current from electrical current source 26 to reactor plate assembly 28 so long as high pressure limit switch 116 detects a gas pressure threshold of less than about 225 psi. If the controller's timer times out before low pressure limit switch 118 detects the threshold low pressure at which chemical energy conversion device may be started, the controller actuates a solenoid on the electrical current source 26 to terminate the supply of current from the first bank of batteries to the reactor plate assembly 28, and directs current instead from the second bank of batteries to the reactor plate assembly, while the first bank of batteries are recharged or permitted to recover. Controller 128 initiates a 15-minute timer for supplying electrical current to the reactor plate assembly until low pressure limit switch 118 detects that the low pressure threshold (e.g. 150 psi) has been reached, at which point controller 128 ensures that high pressure solenoid 114 and low pressure solenoid 122 are open so that hydrogen and oxygen gases are supplied to chemical energy conversion device 14, which is started to produce electrical current at electrical terminals 98. The timing cycle between the first and second banks of batteries of the electrical current source 26 is continued until high pressure limit switch 116 detects a threshold high pressure value (such as 225 psi) at which point controller 128 halts the supply of current from electrical current source 26 to reactor plate assembly 28 to thus halt the production of hydrogen and oxygen gases inside reactor 12. Once high pressure limit switch 116 has detected that the gas pressure has dropped below the threshold upper limit (e.g. 225 psi) the controller 128 resumes the electrolysis process in reactor 12 by once again supplying current to the reactor plate assembly 28 from electrical current source 26 in alternating fashion between the banks of batteries.

Thus, as long as the hydrogen and oxygen gas pressure is between the low and high threshold limits, chemical energy conversion device 14 is operated to produce electricity from the reaction of hydrogen and oxygen, which supplies at least some current back to electrical current source 26, whose operation is cycled between two banks of batteries to supply electrical current to reactor plate assembly 28 submerged in water inside reactor vessel 20 to generate more hydrogen and oxygen gases from electrolysis. In the event that gas pressure drops below the low pressure threshold detected by low pressure limit switch 118, operation of chemical energy conversion device 14 may be halted if necessary by closing low pressure solenoid 122, while current continues to be supplied to reactor plate assembly 28 from electrical current source 26 until sufficient pressure is once again reached to operate the chemical energy conversion device 14.

In the event that the high threshold pressure is reached and detected by high pressure limit switch 116, current flow out of electrical current source 26 is halted so that electrolysis inside of reactor 12 ends until sufficient excess hydrogen and oxygen have been consumed by chemical energy conversion device 14, so that current can once again be supplied to reactor plate assembly 28 for the production of more hydrogen and oxygen gases. The temperature of water inside reactor vessel 12 is maintained in an optimal range by high pressure heat exchanger 22, which is configured for operation at the typical operating pressures found in the reactor vessel 20, and which may be operated in combination with low pressure heat exchanger 24, such as a radiator, for drawing heat out of the water cycled through high pressure heat exchanger 22 from reactor vessel 20.

Figure 6:
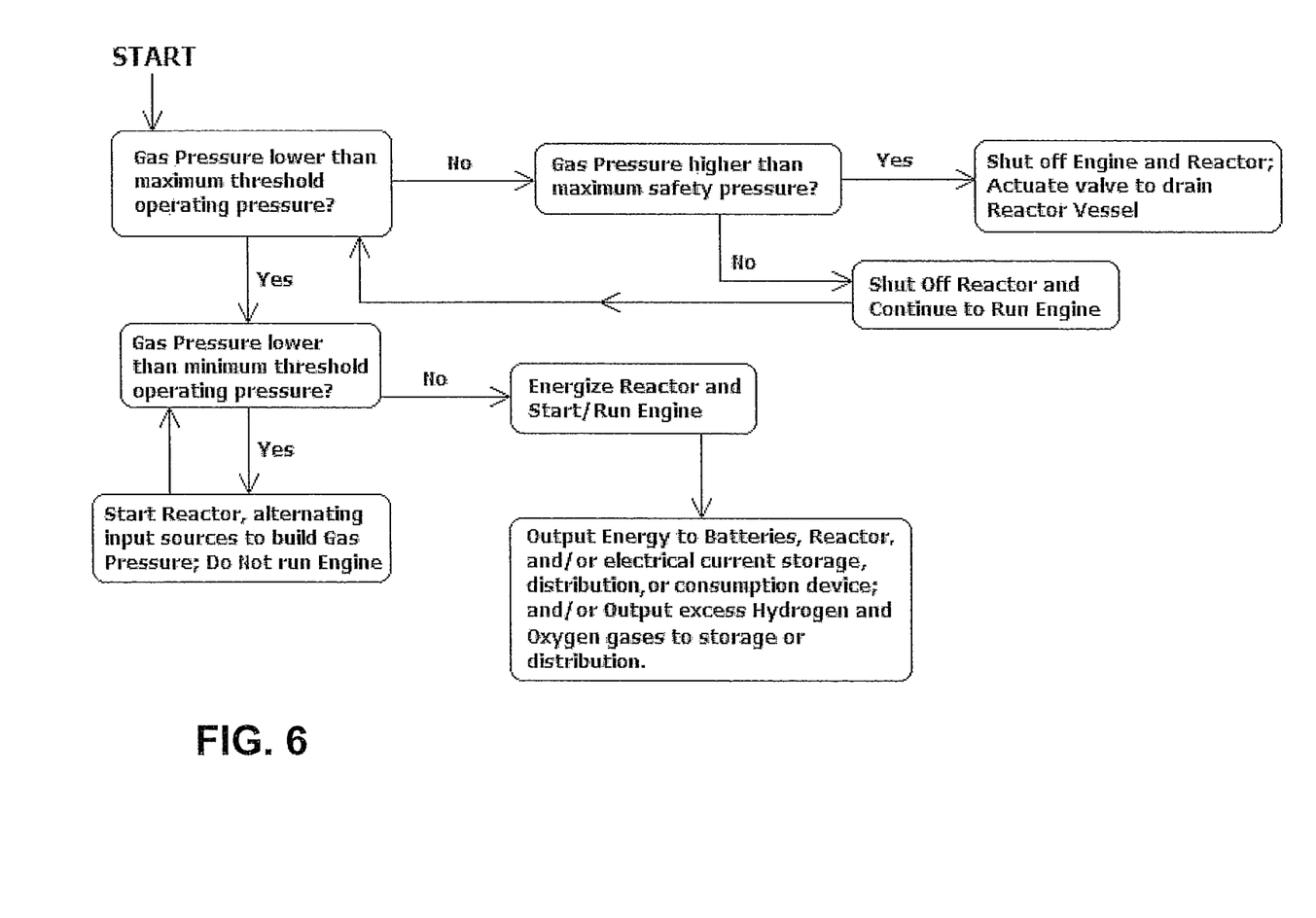
FIG. 6 is a flow chart of a hydrogen generating method in accordance with the present invention.

Optionally, a high pressure safety switch is incorporated in the apparatus, such as along third gas conduit 82, for detecting unsafe pressure conditions. For example, when the high pressure safety switch detects a pressure of about 240 psi, operation of the hydrogen generating apparatus may be halted until an operator can assess the situation and rectify any problems. In the event that the high pressure safety switch detects a pressure of, for example, approximately 245 psi, controller 128 may direct valve 64 at the bottom of reactor vessel 20 to drain substantially all of the water from reactor vessel 20 and thus halt electrolysis while also reducing the fluid pressure inside the reactor vessel. A general understanding of the above method of generating hydrogen gas may be obtained with reference to the simplified flow chart of FIG. 6. Optionally, hydrogen generator apparatus may be operated in a "flush and fill" mode in which sediment (such as hard water deposits or metal particles or compounds) may be flushed out of the apparatus and/or the apparatus may be refilled with water. Typically, flushing sediment involves draining water and sediment from low points in the apparatus (e.g. at drain valves 64, 76), followed by refilling the apparatus with fresh water.

Accordingly, the present invention provides a method and apparatus for generating hydrogen for various uses including, for example, fueling a fuel cell or an internal combustion engine to produce mechanical work and/or electrical current that may be used within the hydrogen generating apparatus itself, or that may be directed for other uses. The system operates highly efficiently to produce hydrogen and oxygen gases through an electrolysis process, and includes numerous safety measures for ensuring that the gases are handled safely, cleanly, and efficiently while minimizing risk of accidents or undesirable operating parameters. A programmable logic controller is operable to initiate electrolysis in the reactor, to control operation of a chemical energy conversion device for converting the chemical energy of the gases into electrical energy, for controlling the electrical current directed throughout the system, and for monitoring and controlling the operating parameters of the apparatus to ensure safe, efficient operation.

By producing a relatively high-volume and high-pressure supply of a stoichiometric mixture of hydrogen and oxygen, and using this supply for fueling a chemical energy conversion device, the harmful emissions (e.g. CO, $CO_2$, $SO_x$, and $NO_x$) common to the burning of fossil fuels can be largely avoided. In the case of hydrogen combusting in pure oxygen in an internal combustion engine, there may be trace amounts of these emissions owing to the presence of trace amounts of lubricating oil in the combustion chamber, but it will be appreciated that the exhaust from such combustion processes is substantially pollution-free.

Changes and modifications to the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property is claimed are defined as follows:

1. A method of generating hydrogen gas, said method comprising:
   providing a reactor vessel having at least one cathode plate and at least one anode plate and containing a volume of water in which the cathode plate and the anode plate are at least partially submerged;
   providing a buffer tank containing a volume of liquid and having a gas inlet submerged in the volume of liquid and a gas outlet positioned above the volume of liquid;
   providing a chemical energy conversion device, a fluid conduit coupled between the reactor vessel, the buffer tank, and the chemical energy conversion device, and first and second electrical current sources, wherein the buffer tank is positioned between and in fluid communication with the reactor vessel and the chemical energy conversion device;
   energizing at least one of the cathode plate and the anode plate with electrical current supplied by the first electrical current source;
   generating hydrogen and oxygen via electrolysis in the reactor vessel;
   sensing a fluid pressure of the hydrogen and the oxygen;
   measuring an elapsed time of said energizing of at least one of the cathode plate and the anode plate with the first electrical current source;
   if the elapsed time of said energizing exceeds a predetermined amount of time, de-energizing the at least one of the cathode plate and the anode plate with the first electrical current source and re-energizing the at least one of the cathode plate and the anode plate with the second electrical current source;
   after the fluid pressure of the hydrogen and the oxygen reaches a predetermined threshold pressure, activating the chemical energy conversion device to chemically react the hydrogen with the oxygen to produce electrical current; and
   supplying the electrical current from the chemical energy conversion device to at least one of the first and second electrical current sources and at least one of the cathode plate and the anode plate.

2. The method of claim 1, wherein the chemical energy conversion device comprises a fuel cell.

3. The method of claim 2, wherein said activating the chemical energy conversion device comprises reacting the hydrogen with the oxygen to directly produce the electrical current in the fuel cell.

4. The method of claim 1, wherein the chemical energy conversion device comprises an internal combustion engine and an electrical generator.

5. The method of claim 4, wherein said activating the chemical energy conversion device comprises:
   combusting the hydrogen with the oxygen in the internal combustion engine to produce mechanical energy; and
   driving the electrical generator with the mechanical energy of the internal combustion engine to produce the electrical current at the electrical generator.

6. The method of claim 1, wherein said energizing, said generating, said activating, and said supplying are selectively controlled by a controller comprising a programmable logic controller.

7. The method of claim 6, wherein the chemical energy conversion device comprises a fuel cell.

8. The method of claim 7, wherein said activating the chemical energy conversion device comprises reacting the hydrogen with the oxygen to directly produce the electrical current in the fuel cell.

9. The method of claim 6, wherein the chemical energy conversion device comprises an internal combustion engine and an electrical generator.

10. The method of claim 9, wherein said activating the chemical energy conversion device comprises:
    combusting the hydrogen with the oxygen in the internal combustion engine to produce mechanical energy; and
    driving the electrical generator with the mechanical energy of the internal combustion engine to produce the electrical current at the electrical generator.

11. A method of generating hydrogen gas, said method comprising:
providing a reactor vessel having at least one cathode plate and at least one anode plate and containing a volume of water in which the cathode plate and the anode plate are at least partially submerged;
providing a buffer tank containing a volume of liquid and having a gas inlet submerged in the volume of liquid and a gas outlet positioned above the volume of liquid;
providing a chemical energy conversion device, providing a fluid conduit coupled between the reactor vessel, the buffer tank, and the chemical energy conversion device, and providing first and second electrical current sources, wherein the buffer tank is positioned between and in fluid communication with the reactor vessel and the chemical energy conversion device;
energizing at least one of the cathode plate and the anode plate with electrical current supplied by the first electrical current source;
generating hydrogen and oxygen via electrolysis in the reactor vessel;
directing the hydrogen and oxygen from the reactor vessel and into the buffer tank at the gas inlet;
sensing a fluid pressure of the hydrogen and the oxygen;
measuring an elapsed time of said energizing of at least one of the cathode plate and the anode plate with the first electrical current source;
if the elapsed time of said energizing exceeds a predetermined amount of time, de-energizing the at least one of the cathode plate and the anode plate with the first electrical current source and re-energizing the at least one of the cathode plate and the anode plate with the second electrical current source;
after the fluid pressure of the hydrogen and the oxygen reaches a predetermined low threshold pressure, directing the hydrogen and the oxygen from the buffer tank to the chemical energy conversion device, and activating the chemical energy conversion device to chemically react the hydrogen with the oxygen to produce electrical current;
supplying the electrical current from the chemical energy conversion device to at least one of the first and second electrical current sources and to at least one of the cathode plate and the anode plate;
sensing whether the fluid pressure of the hydrogen and the oxygen exceeds a predetermined high threshold pressure; and
if the fluid pressure of the hydrogen and the oxygen exceeds the predetermined high threshold pressure, de-energizing the at least one of the cathode plate and the anode plate to reduce or halt said generating hydrogen and oxygen via electrolysis in the reactor vessel at least until the fluid pressure of the hydrogen and the oxygen no longer exceeds the predetermined high threshold pressure.

12. The method of claim 11, further comprising:
measuring an elapsed time of said re-energizing of at least one of the cathode plate and the anode plate with the second electrical current source;
if the elapsed time of said re-energizing exceeds a predetermined amount of time, de-energizing the at least one of the cathode plate and the anode plate with the second electrical current source and re-energizing the at least one of the cathode plate and the anode plate with the first electrical current source; and
alternating between energizing the at least one of the cathode plate and the anode plate with the first electrical current source and with the second electrical current source at least until the fluid pressure of the hydrogen and the oxygen reaches the predetermined low threshold pressure.

13. The method according to claim 12, further comprising:
providing a backfire suppression apparatus between the buffer tank and the chemical energy conversion device, the backfire suppression apparatus in fluid communication with the buffer tank and the chemical energy conversion device via the fluid conduit;
wherein said directing the hydrogen and the oxygen from the buffer tank to the chemical energy conversion device comprises directing the hydrogen and the oxygen from the buffer tank to the backfire suppression apparatus, and from the backfire suppression apparatus to the chemical energy conversion device; and
preventing a flame from propagating from said chemical energy conversion device to said buffer tank with said backfire suppression apparatus.

14. A method of generating hydrogen gas, said method comprising:
providing a reactor vessel having at least one cathode plate and at least one anode plate, the reactor vessel containing a volume of water in which the cathode plate and the anode plate are at least partially submerged;
providing a buffer tank containing a volume of liquid and having a gas inlet submerged in the volume of liquid and a gas outlet positioned above the volume of liquid;
providing a chemical energy conversion device, a fluid conduit coupled between the reactor vessel, the buffer tank, and the chemical energy conversion device, and first and second electrical current sources, wherein the buffer tank is positioned between and in fluid communication with the reactor vessel and the chemical energy conversion device;
energizing at least one of the cathode plate and the anode plate with electrical current supplied by the first electrical current source;
generating hydrogen and oxygen via electrolysis in the reactor vessel;
sensing a fluid pressure of the hydrogen and the oxygen;
measuring an elapsed time of said energizing of at least one of the cathode plate and the anode plate with the first electrical current source;
if the elapsed time of said energizing exceeds a predetermined amount of time, de-energizing the at least one of the cathode plate and the anode plate with the first electrical current source and re-energizing the at least one of the cathode plate and the anode plate with the second electrical current source;
after the fluid pressure of the hydrogen and the oxygen reaches a predetermined threshold pressure, directing the hydrogen and the oxygen to the chemical energy conversion device to chemically react the hydrogen with the oxygen in the chemical energy conversion device;
producing electrical current with the chemical energy conversion device; and
supplying the electrical current from the chemical energy conversion device to at least one of the first and second electrical current sources and at least one of the cathode plate and the anode plate.

15. The method of claim 14, wherein the cathode plate and the anode plate are both substantially planar.

16. The method of claim 14, wherein the chemical energy conversion device comprises an internal combustion engine.

17. The method of claim 16, wherein the internal combustion engine comprises a four-stroke reciprocating engine.

\* \* \* \* \*